JOHN R. SMITH.

Improvement in Grate-Bars.

4,511.

Reissued August 8, 1871.

Witnesses;
Edw. W. Donn
N. H. Peters

J. R. Smith Inventor;
By J. A. Bassett Atty

AM. PHOTO-LITHOGRAPHIC CO. N.Y. (OSBORNE'S PROCESS.)

UNITED STATES PATENT OFFICE.

JOHN R. SMITH, OF SALEM, MASSACHUSETTS.

IMPROVEMENT IN GRATE-BARS.

Specification forming part of Letters Patent No. 70,638, dated November 5, 1867; reissue No. 4,511, dated August 8, 1871.

*To all whom it may concern:*

Be it known that I, JOHN R. SMITH, of Salem, in the county of Essex and State of Massachusetts, have invented certain Improvements in Grate-Bars, of which the following is a specification:

My invention consists in constructing a grate-bar for furnaces in the form of a double or reverse curve, and in the combination of a series of such bars united by lugs and flanges to form a section or one bar; and the further combination, with a bar of the form above described, of a projection, forming a support below the line of its lower edge; also, the combination, with the double-curved bar, of a peculiarly-formed fitting piece to make the sides of a line of bars straight.

Figure 1:
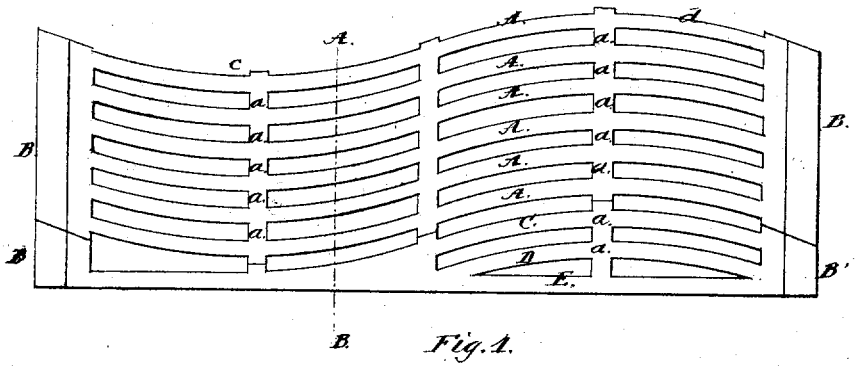
Figure 2:
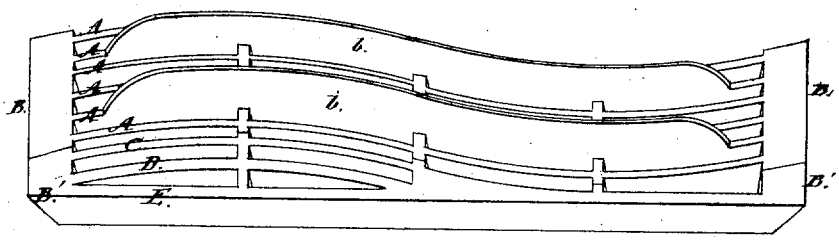
Figure 3:
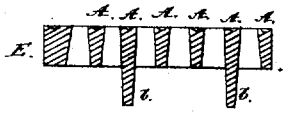

In the accompanying drawing, Figure 1 represents a top or plan view of one of my improved grate-bars. Fig. 2 represents a perspective view of the bar when turned bottom side up; and Fig. 3 represents a cross-section on the line A B, Fig. 1.

To enable those skilled in the art to which my invention belongs to make and use the same, I will proceed to describe it more in detail.

In the drawing a series of double-curved ribs, A, united at each end by the flanges B B and at intermediate points by the lugs *a*, is shown as constituting, in this instance, one bar; but a greater or lesser number of double-curved ribs, A, may be used in a single bar. To give greater strength to the bar one or more of the ribs A in each bar are made to project down below the ribs A, as seen at *b*, Fig. 2. To fill up and make the sides of the bar straight a side piece is made with a straight rib, E, and end plunger B′ B′, and two short curved ribs, C D, which, when applied as shown in the drawing, fit the side of the grate-bar perfectly and make the side straight, as clearly indicated in the drawing. The side piece will fit either side of the bar, so that only one pattern is necessary for side piece and one for grate-bar. By making the ribs A with a double curve, *c d*, the bar is not so liable to be strained and injured by unequal heating as it would be if the ribs were straight or even of a single curve. For instance, if one side of the bar becomes heated first the bar yields on the opposite side and thus prevents the injury to the bar which would result from the sudden expansion of one side without suitable provision for a corresponding bending of the bar on the other side. By the use of one or more projections, *b*, which are also double curved, and the connecting-piece *a*, in combination with the double-curved ribs A, a grate-bar is produced of great strength and durability, and yet one which is comparatively light.

I claim as my invention—

1. A grate, constructed of the double-curved ribs A, substantially as and for the purpose specified.

2. The double-curved ribs A, in combination with the flanges B B and connections *a*, substantially as and for the purposes set forth.

3. The combination, with the double-curved ribs A, of one or more projections, *b*, flanges B B, and connections *a*, as and for the purposes set forth.

4. The combination, with the side of the bar, of the peculiarly-constructed filling-piece, composed of the parts lettered B′ B′, C D, and E, for the purpose stated.

JOHN R. SMITH.

Witnesses:

JOHN A. BASSETT,

J. R. NICHOLS.